H. O. WESTENDARP.
MEANS FOR CONTROLLING AND REVERSING VESSELS.
APPLICATION FILED MAR. 28, 1917.

1,257,165.

Patented Feb. 19, 1918.
4 SHEETS—SHEET 1.

Inventor,
Henry O. Westendarp,
by Albert G. Davis
Att'y.

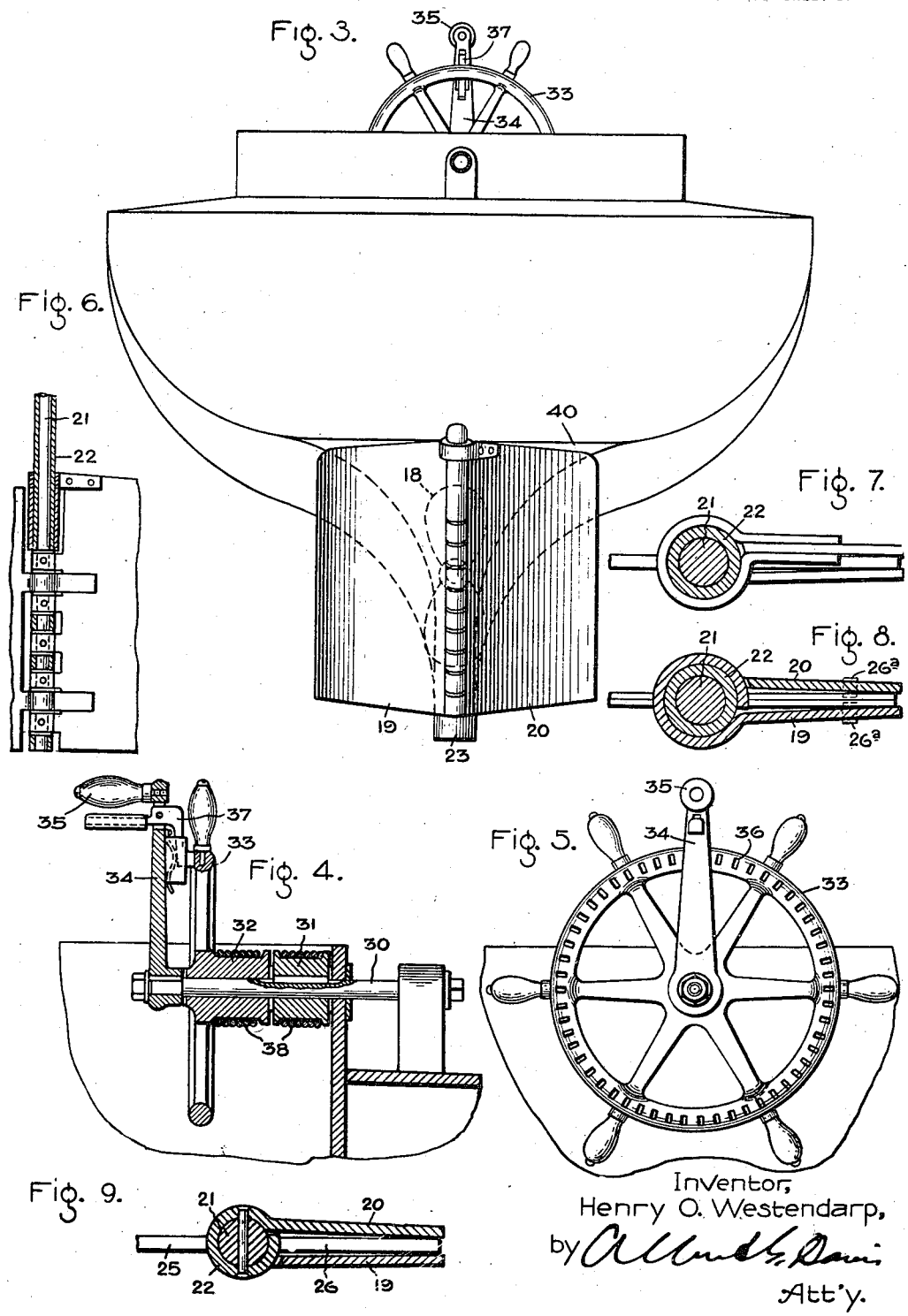

H. O. WESTENDARP.
MEANS FOR CONTROLLING AND REVERSING VESSELS.
APPLICATION FILED MAR. 28, 1917.
1,257,165.
Patented Feb. 19, 1918.
4 SHEETS—SHEET 3.
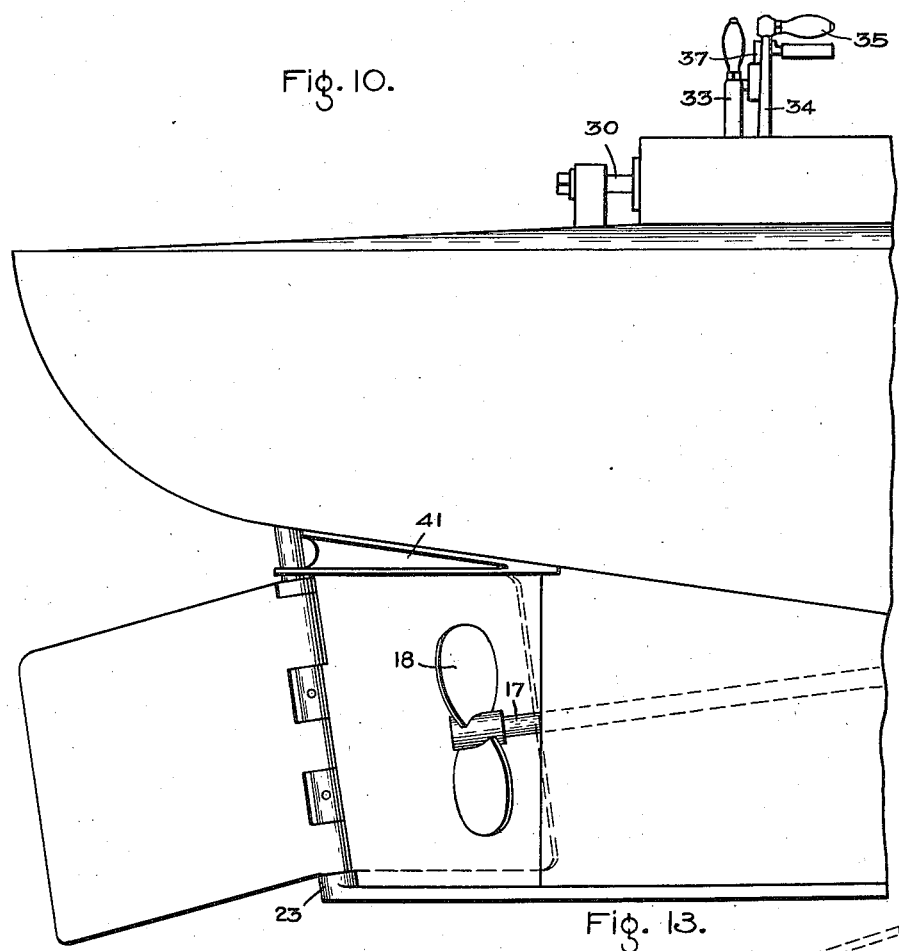
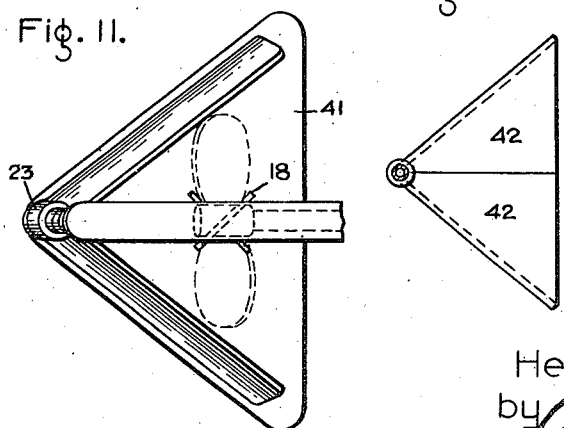
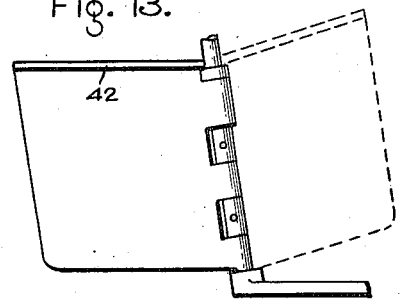
Inventor,
Henry O. Westendarp,
by Albert G. Davis
Att'y.

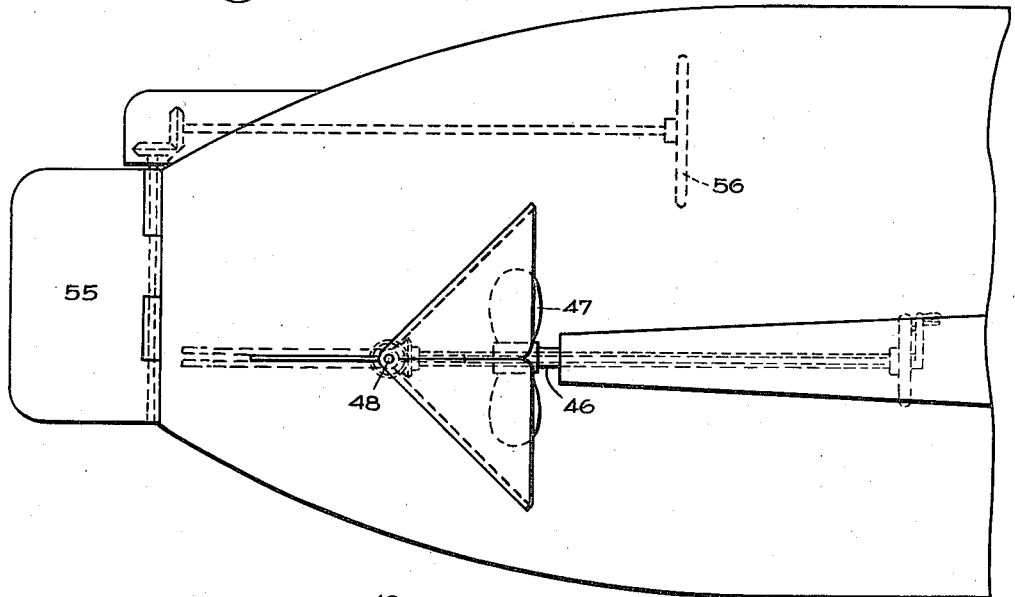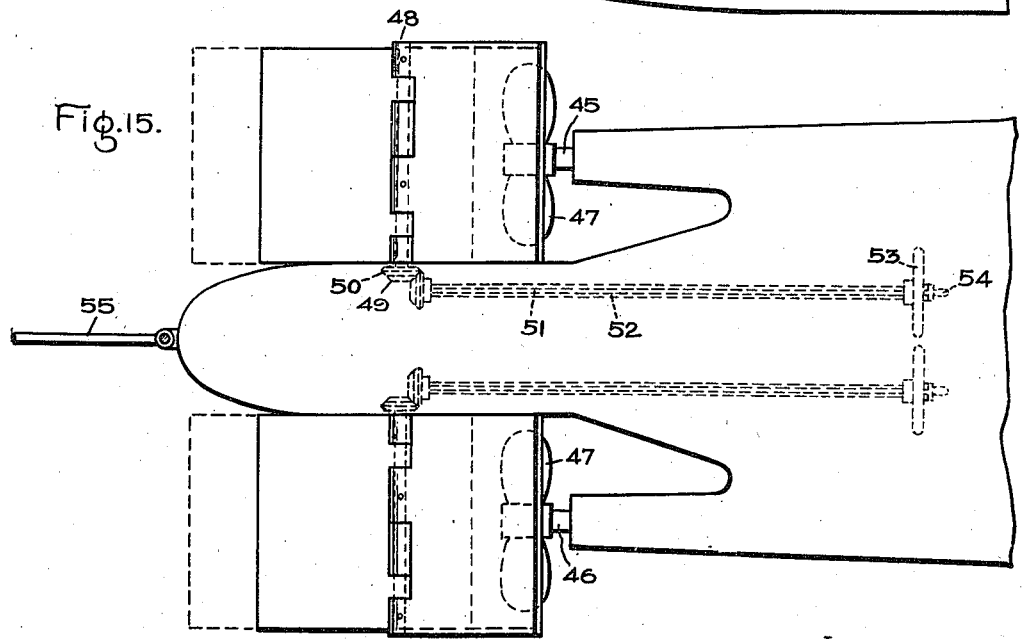

UNITED STATES PATENT OFFICE.

HENRY O. WESTENDARP, OF SAUGUS, MASSACHUSETTS, ASSIGNOR TO GENERAL ELECTRIC COMPANY, A CORPORATION OF NEW YORK.

MEANS FOR CONTROLLING AND REVERSING VESSELS.

1,257,165.

Specification of Letters Patent.   Patented Feb. 19, 1918.

Application filed March 28, 1917.   Serial No. 158,082.

*To all whom it may concern:*

Be it known that I, HENRY O. WESTENDARP, a citizen of the United States, residing at Saugus, in the county of Essex, State of Massachusetts, have invented certain new and useful Improvements in Means for Controlling and Reversing Vessels, of which the following is a specification.

The present invention has for its object to provide improved means for controlling and reversing vessels without reversing the motive power agent. The invention also has for its object to provide improved means for controlling submarines whereby they can be more readily submerged and brought to the surface.

For a consideration of what I believe to be novel and my invention, attention is directed to the accompanying description and claims appended thereto.

Figure 1:
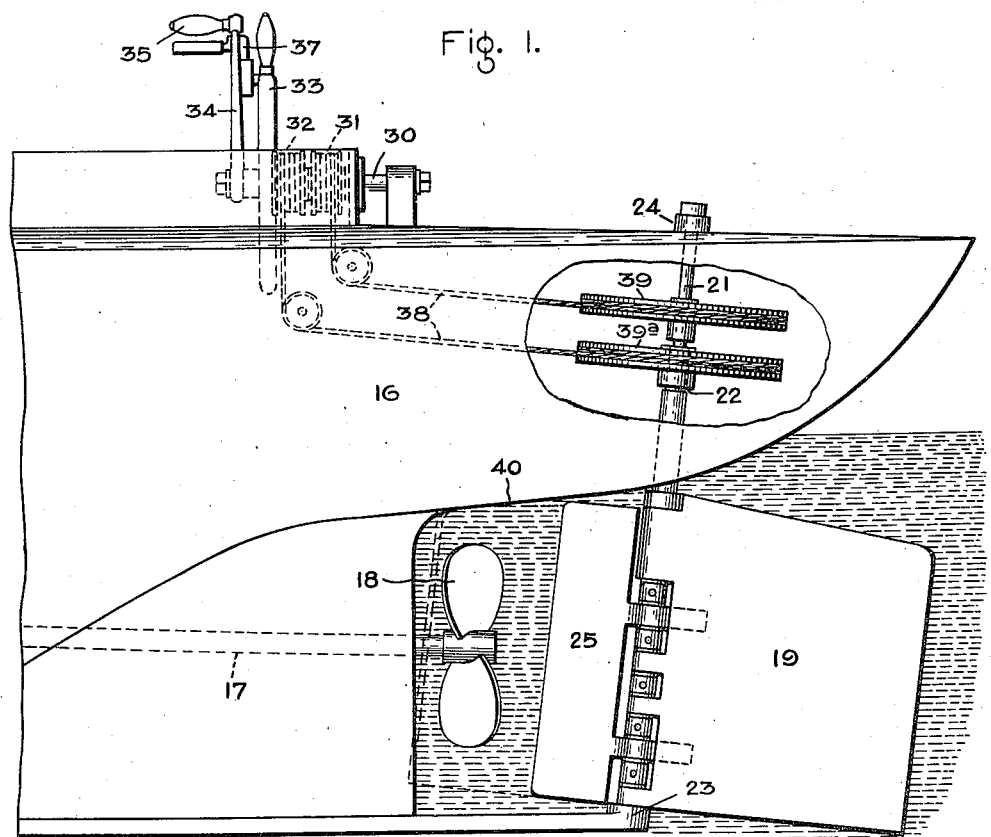
Figure 2:
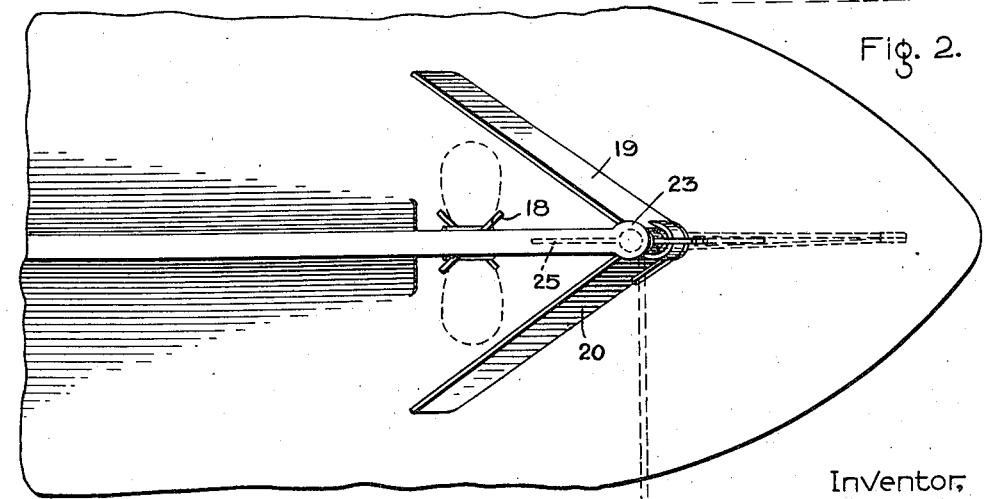

In the accompanying drawings which are illustrative of my invention, Figure 1 is a view in side elevation of the stern portion of a vessel equipped with my improved apparatus; Fig. 2 is an inverted plan view of the same; Fig. 3 is a rear view of the vessel; Fig. 4 is a detail view of the rudder operating mechanism; Fig. 5 is a front view of said mechanism; Figs. 6, 7, 8 and 9 are detail views of the rudder; Figs. 10 to 13 are detail views of modifications whereby stopping and reversing may be more effectively carried out, and Figs. 14 and 15 show my improved apparatus applied to a submarine for the purpose of causing it to be submerged and brought to the surface.

16 indicates the hull of the vessel which may be of any suitable or usual construction, but preferably it should be so constructed, or special means provided, to permit of the substantial closure of the space between its under side and the upper edges of the rudder when the latter is moved to its forward position to prevent the free passage of water between said hull and said rudder, as will appear more fully hereinafter.

The vessel may be propelled by any desired type of motive power agent, which need not be of the reversing type thereby permitting the use of very simple apparatus. 17 indicates the shaft of the motive power agent, such as an internal combustion engine and 18 a propeller of any suitable character. The angle which the shaft occupies with respect to the keel of the vessel is not material, but the angle which it makes with the rudder post should be greater than 90° if the best results are to be obtained. The purpose of this is to prevent the water leaving the propeller from being deflected downward under the rudder where a portion of its effect would be lost in slowing down and reversing the vessel as will appear more fully later. The rudder comprises two principal members 19 and 20, which, for ordinary steering purposes, move as a single unit, and for that purpose can be considered as such. For decreasing the speed of the vessel, stopping and reversing it, the members of the rudder are separated, one member moving clockwise and the other anti-clockwise about the axis of the rudder post. To this end such member is made of suitable size and thickness of stock. One member is rigidly keyed or pinned at one side to a spindle 21, Fig. 6, and the other is similarly connected to a sleeve 22 concentric therewith. The upper portion only of the member 20 is attached to the sleeve, the lower portion being supported by the spindle which acts after the fashion of the pin in an ordinary pin hinge. The spindle and sleeve which form the rudder post extend upwardly and terminate in the hull of the vessel or they may extend above the deck as desired. The spindle is provided with a suitable bearing 23 at its lower end which may be supported on an extension of the keel as is usual in such cases and one or more intermediate bearings. It is also provided with a bearing 24 at its upper end which is supported at any suitable point. The sleeve 22 is also provided with the necessary bearings. As any rudder of this type, *i. e.* one supported at one side is sometimes hard to move, it is preferable to balance it to a certain extent. To this end a balancing device 25, Figs. 1 and 9, is provided which is loosely mounted on the spindle 21. To hold said balancing device in alinement with the rudder when it is closed; *i. e.*, the two members in parallel alinement, extensions or arms 26 are attached to said device which extend between the two members 19 and 20, said members engaging and holding the arms. Under these conditions a partial and sufficient balance is effected and the rudder operates in the manner of any so-called balanced rudder.

In Fig. 9 a single balancing device or means is provided, but in Fig. 8 two such devices are provided and supported in the same manner as above described, the purpose being to balance the pressure on the rudder members to a greater or less extent when they are opened. To make sure that the parts of the balancing device separate with the parts of the rudder when the latter starts to open special means are employed. These can be made in a variety of ways. As shown, pins 26ª are mounted on the rudder members or on the balancing means which enter the members or the means as the case may be. The fit should be tight enough to cause some friction. After the parts of the balancing device are well started in their opening movement the pressure of the water will cause them to follow the individual rudder members. If the surfaces around the pins and those around the holes in the receiving parts are made smooth there will also be a suction effect which is helpful during the starting movement. In some cases the pins can be omitted and reliance placed upon said suction effect. In order to move the rudder for normal steering, and also to separate the members for slowing the vessel, stopping and reversing it, the following mechanism is provided.

On the deck or at any other convenient place is located a shaft 30, Fig. 4, which is suitably supported in bearings. Keyed to the shaft is a winding drum 31 and loosely mounted thereon is a second winding drum 32 to which is affixed the steering wheel 33. Rigidly attached to the shaft is a lever or arm 34 terminating in a handle 35. On the front face of the wheel are locking notches 36, Fig. 5, and on the lever is a locking device comprising a spring pressed finger 37 arranged to enter the notches and lock the wheel and lever so that they move as a unit. For ordinary steering purposes the said parts are locked and rotation of the wheel steers the vessel as usual. This is accomplished by means of chains or wire ropes 38, Figs. 1 and 4, or a combination of both, which pass around said drums and also around drums 39 and 39ª, the drum 39 being attached to the spindle 21 and drum 39ª to the sleeve 22. It is evident from the above that if the wheel and lever are unlocked and one is rotated with respect to the other that one member of the rudder will be moved clockwise and the other anti-clockwise with the result of spreading or separating said members and opposing the forward movement of the vessel to a greater or less extent, it being assumed of course that the propeller 18 is continuously rotated. This retarding action increases until the two members occupy the same plane and are transverse to the movement of the vessel. Further rotation of one drum with respect to the other causes the rudder members to approach each other, but on the opposite side of the rudder post axis, with the result of causing a backing or reversing of the vessel. This action increases as the members approach each other until they form an acute angle, as shown in Fig. 2 where the maximum reversing action is obtained. This reversing is due to the fact that the water discharged from the propeller instead of escaping freely is forced by the rudder members to reverse its direction and flow forward. Under these conditions the reaction of the body of water is sufficient to cause the vessel to move astern instead of ahead and at a suitable rate of speed for the purpose. To quickly stop the vessel the rudder members may be immediately moved to their forward positions. After folding or moving the rudder forward by the independent manipulation of the steering wheel and hand lever, and locking the parts by the latch, the wheel can be turned and the rudder as a whole will act to steer the vessel at the same time it is acting as a reversing means provided the members have not been moved to their extreme forward position to get full reversing effect. If said members have been so moved steering is accomplished by unlocking the hand lever 34 and wheel 33 and rotating the proper member independently of the other. For example, the rudder member 20 can be moved to the position shown in dotted lines in Fig. 2, the member 19 remaining in its extreme forward position.

From actual experience with a vessel equipped with a rudder of the character described, I have ascertained that when the members of the rudder are opened to reverse the vessel a portion of the water leaving the propeller flows upward above the normal level or surface where it entrains air and then returns to the propeller. The presence of air in the water in the region of the propeller causes cavitation and results in partial failure of the backing operation. I have discovered means by which this objectionable action can be prevented. As previously stated, the axis of the propeller shaft and the rudder post are preferably disposed at an angle slightly greater than a right angle, the purpose being to prevent water leaving the propeller from being deflected under the rudder where its effect would be lost. The arrangement shown has a tendency to deflect the water over the rudder. To avoid this the under surface of the hull is so shaped on both sides of the center at the portion marked 40 that when the rudder members are moved to the position shown in Fig. 2, there will be little or no space between the upper edges and the hull. This causes substantially all of the water from the propeller to be reversed and flow forward thereby giving the maximum reversing effect to the vessel. Inasmuch as my invention can readily be applied to existing vessels which do not have the portion 40 of the hull constructed as described above, it is necessary to provide other means to accomplish this result. One such means is shown in Figs. 10 and 11 and comprises filling blocks 41, one on each side, which are secured to the under side of the hull and properly shaped to conform thereto, and also to the upper edges of the rudder members when moved to reversing position. The blocks may be formed separately or in a single structure. As such an arrangement will interfere somewhat with the smooth lines of the hull which are generally to be desired, especially in high speed vessels, the arrangement shown in Figs. 12 and 13 is preferable. It comprises flanges 42, one on each member of the rudder which normally extend outwardly therefrom at an angle of about 90°. During normal steering operation they exert no particular effect, because they are about parallel to the surface of the water, but as soon as the members are moved into reversing position as shown in Fig. 12 they act to receive the water from the propeller and direct it forward in an effective manner and prevent spilling over the top.

In Figs. 14 and 15 my invention is shown applied to a submarine for the purpose of causing it to submerge or rise to the surface as may be desired. In these figures 45 and 46 indicate the shafts of the propelling motors, each having a propeller 47. Associated with each of the propellers is a folding rudder of the type previously described. The supports 48 for the rudder are carried by the hull and are suitably held in place. Inside the hull are beveled gears 49 and 50 which mesh with other gears on the solid shaft 51 and hollow shaft 52. The shafts are rotated by the hand wheel 53 and handle 54. The rudders during normal operation above or below the surface of the water extend rearwardly as shown in dotted lines, Fig. 15. To submerge or rise the members are manipulated in the same manner as previously described, but they move about horizontal axes instead of vertical. When operating submerged the folding rudders can be used to change the course of the submarine in a vertical plane. For steering the vessel a rudder 55 of ordinary construction is employed which is actuated by the hand wheel 56 through suitable power transmitting means.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In a vessel, the combination of a hull, a propeller therefor, a driving shaft therefor, a rudder comprising two independently movable members and a balancing means therefor, a rudder post, said members normally occupying a position astern of said post with the balancing means forward of said post, and a means for swinging said members from said astern position to forward positions where they form acute angles with said shaft for deflecting the water from the propeller forwardly and cause the vessel to move astern.

2. In a vessel, the combination of a hull, a propeller therefor, a propeller shaft, a rudder comprising two members that act as a unit to steer the vessel when moving ahead, a post for the rudder, means for moving the members from positions astern of the post to positions ahead of said post for causing the vessel to go astern, and means acting when the vessel goes astern to prevent the water leaving the propeller from freely flowing upward between the upper edges of said members and the hull.

3. In a vessel, the combination of a hull, a propeller therefor, a propeller shaft, a rudder comprising two members that act as a unit to steer the vessel, a post on which the members are pivotally supported, said post being inclined astern with respect to the shaft by an amount greater than 90 degrees, means for swinging the members around the post to positions making acute angles with respect to the shafts for reversing, and means for preventing the water leaving the propeller from flowing freely between the tops of said members and the hull.

4. In a vessel, the combination of a hull, a propeller therefor, a rudder comprising two members, a support therefor, means for simultaneously swinging the members from a position astern of the support to positions ahead of the support where they form acute angles with the shaft for causing the vessel to go astern, means for moving one member when in reversing position and independently of the other for steering the vessel, and means for preventing the water leaving the propeller from flowing freely between the tops of said members and the hull.

5. In a vessel, the combination of a hull, a propeller therefor which is always driven in the same direction, a divided rudder, a support therefor, a balancing device which is loosely mounted on the support, and means for moving the members of the rudder from a position wholly astern of the axis of the support to positions forward of said axis where they form acute angles with a plane passing longitudinally of said vessel for causing the vessel to change its direction of movement.

6. In a vessel, the combination of a hull, a propeller therefor which is always driven in the same direction, a divided rudder, a support therefor, a divided balancing device, the parts of which are loosely mounted on the support and follow said members in their movements, and means for moving the members of the rudder from a position wholly astern of the axis of the support to positions forward of said axis where they form acute angles with a plane passing longitudinally of said vessel for causing the vessel to change its direction of movement.

7. In a vessel, the combination of a hull, a propeller therefor which is always driven in the same direction, a divided rudder, a support therefor, a divided balancing device, the parts of which are loosely mounted on the support and follow said members in their movements, means which cause the parts of the balancing device to initially follow the rudder members in their movements, and means for moving the members of the rudder from a position wholly astern of the axis of the support to positions forward of said axis where they form acute angles with a plane passing longitudinally of said vessel for causing the vessel to change its direction of movement.

8. In a vessel, the combination of a hull, a propeller therefor which is always driven in the same direction, a divided rudder, a support therefor, means coöperating with each member of the rudder to prevent the water discharged by the propeller from flowing over the tops thereof when the members are in their forward positions, and means for moving the rudder members simultaneously or individually from a position astern of the axis of the support to positions forward of said axis where they form acute angles with a plane passing longitudinally of said vessel.

9. In a vessel, the combination of a hull, a propeller therefor which is always driven in the same direction, a divided rudder, a support therefor, a device secured to and moving with each member of the rudder which coöperates with the hull to prevent water discharged from the propeller from flowing over the top of the member, and means for moving the rudder members from a position astern of the support to a position forward of the support.

10. In a vessel, the combination of a hull, a propeller therefor which is always driven in the same direction, a rudder comprising two members, a rudder post upon which the members are supported, a pair of winding drums, means including connectors that pass over the drums for moving the members, a releasable connection between the drums whereby they can be moved simultaneously or separately, and means for preventing the water leaving the propeller from flowing freely between the tops of said members and the hull.

In witness whereof, I have hereunto set my hand this 26th day of March, 1917.

HENRY O. WESTENDARP.